Feb. 10, 1959  R. D. GAMBRILL ET AL  2,872,703
EXTRUSION APPARATUS
Filed Jan. 24, 1955  3 Sheets-Sheet 1
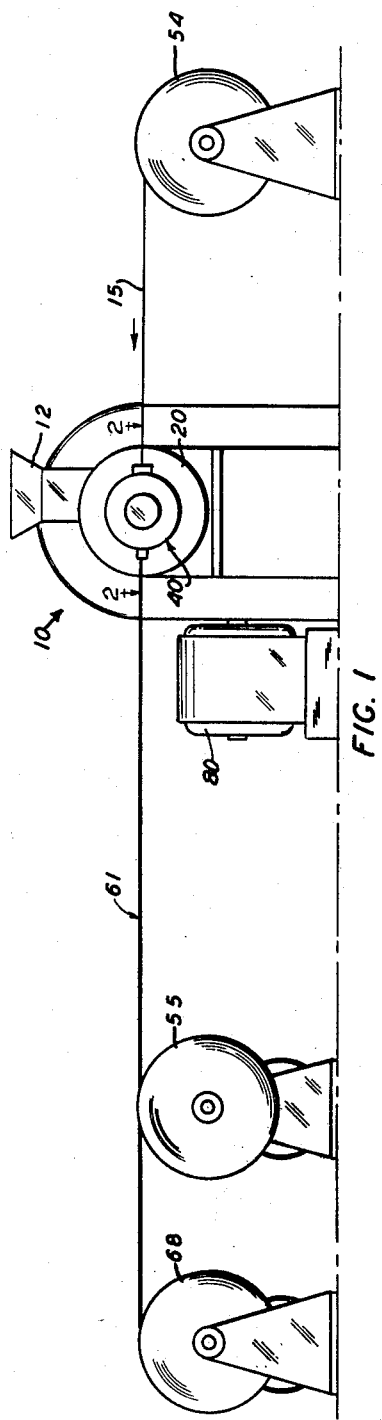
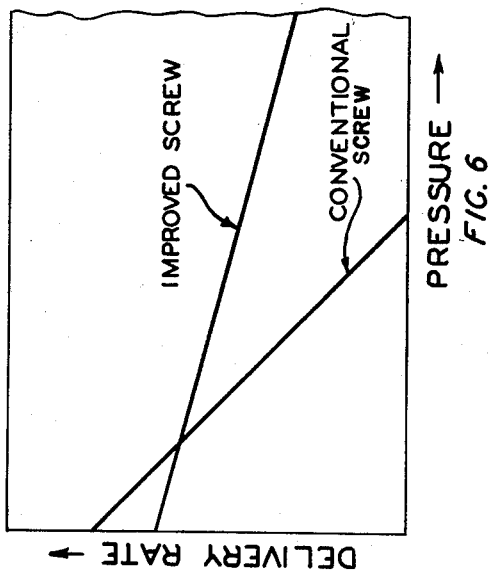
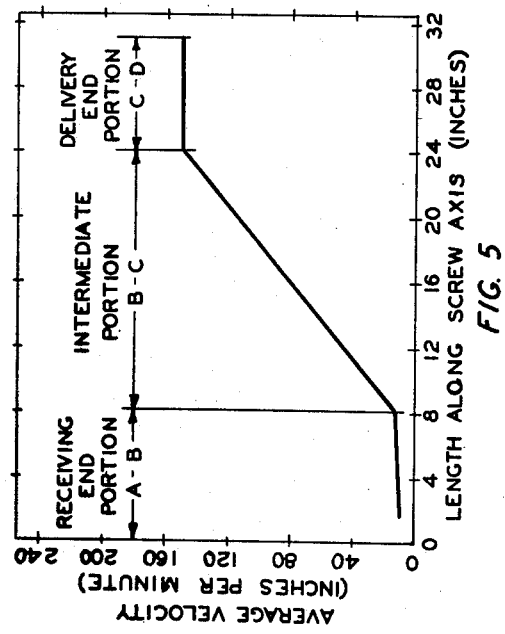
INVENTORS
R. D. GAMBRILL
A. N. GRAY
BY
ATTORNEY

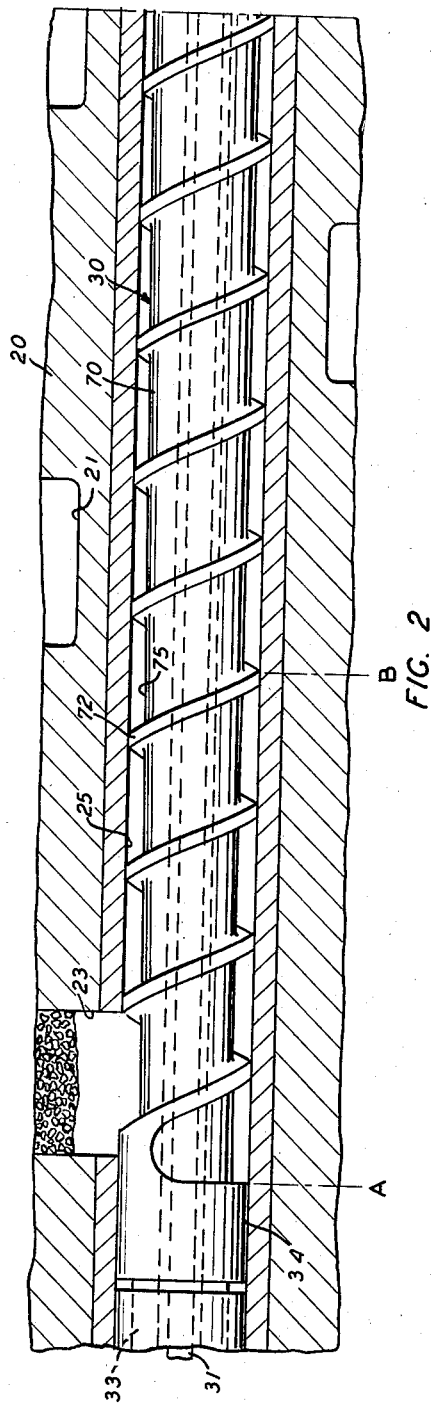
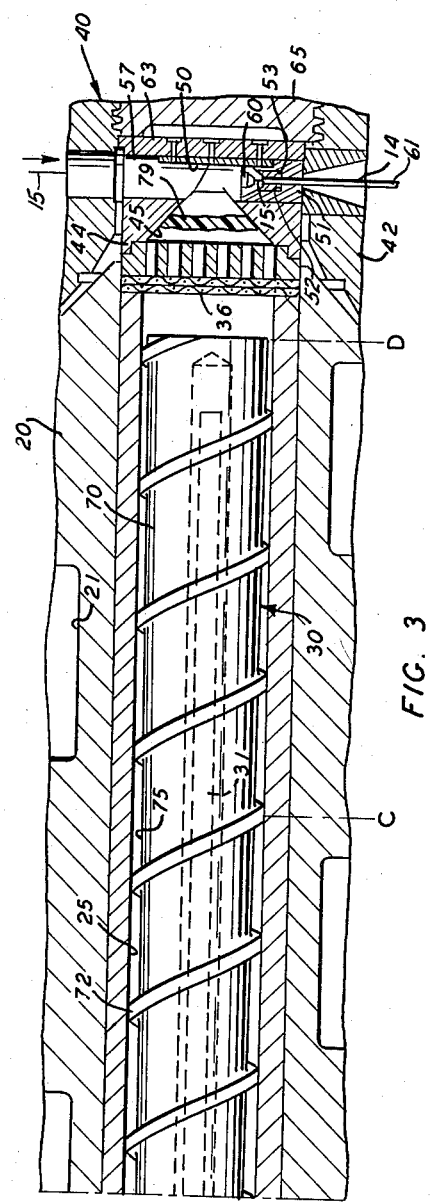

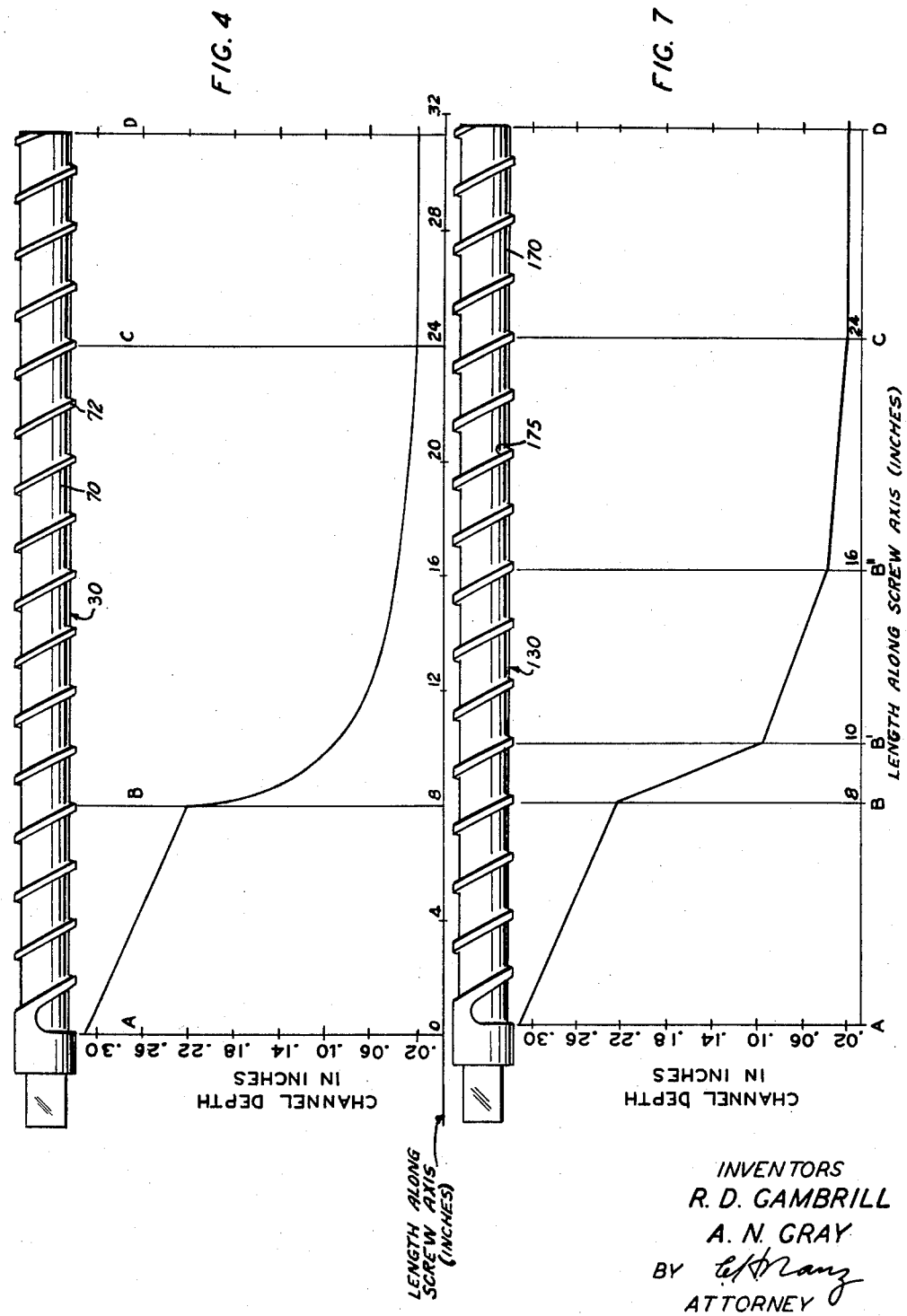

2,872,703
Patented Feb. 10, 1959

2,872,703
EXTRUSION APPARATUS

Richard D. Gambrill, Idlewylde, and Alvin N. Gray, Edgewood, Md., assignors to Western Electric Company, Incorporated, New York, N. Y., a corporation of New York Application January 24, 1955, Serial No. 483,664

5 Claims. (Cl. 18—12)

This invention relates to extrusion apparatus, and more particularly to apparatus for simultaneously advancing and working plastic compounds.

In an extruder designed for the manufacture of insulated wire provided with an extruded covering of a plastic insulating compound, it is necessary to force the plastic insulating compound through a straining device and an extrusion die having relatively high resistances to the flow of the compound. During the usual prolonged operation of such an extruder the straining device gradually becomes clogged and its resistance to flow increases accordingly. Since the dimensions of the extruded covering on the insulated wire are critical, changes in the output rate of the extruder are extremely undesirable and substantial variations therein cannot be tolerated. For this reason the characteristics of the extruding screw employed should be such that there is a minimum change in the output rate for a given variation in the back pressure.

An apparatus illustrating certain features of the invention may include an extrusion cylinder having a longitudinally extending cylindrical bore formed therein, and an extrusion screw fitting closely within the bore and having a helical channel extending substantially from one end to the other end thereof, the channel along the initial portion of the bore being relatively deep, and the channel along a subsequent portion of the bore decreasing in depth hyperbolically.

A complete understanding of the invention may be obtained from the following detailed description of apparatus forming specific embodiments thereof, when read in conjunction with the appended drawings, in which:

Fig. 1 is a side elevation of an apparatus forming one embodiment of the invention;

Figs. 2 and 3 combined constitute an enlarged, fragmentary, horizontal section taken along line 2—2 of Fig. 1;

Fig. 4 is a schematic representation of an extrusion screw forming part of the apparatus shown in Fig. 1;

Fig. 5 is a graph showing the average velocity of a plastic compound at various points along the screw illustrated in Fig. 4;

Fig. 6 is a graph showing the screw characteristics of various types of extrusion screws, and Fig. 7 is a schematic representation of a screw forming part of a modified embodiment of the invention.

Referring now in detail to the drawings, a plastic compound is fed into the entrance end of an extruder, indicated generally at 10 (Fig. 1), from a feed hopper 12. The plastic compound may be initially in the form of granules, pellets or the like, a supply of which is maintained within the feed hopper 12. The extrusion apparatus is designed to form an insulating covering 14 (Fig. 3) of the plastic compound around a filamentary metallic core 15, which may be initially bare or may have a textile, or other covering thereon.

The extruder 10 includes a jacketed extrusion cylinder 20 (Figs. 2 and 3) provided with a helical passage 21 through which a suitable heat exchange medium may be circulated during an extrusion operation for the purpose of controlling the temperature of the plastic compound. The extrusion cylinder 20 has a charging opening 23 at the entrance end thereof, which connects the feed hopper 12 with a longitudinally extending cylindrical extrusion bore 25 formed in the cylinder. The bore 25 is smooth walled and has a uniform diameter along its entire length.

Rotatably mounted within the bore 25 is a hollow stock screw 30. Positioned within the hollow stock screw 30 is a longitudinally extending conduit 31, which is utilized to circulate a suitable heat exchange medium within the screw for the purpose of controlling the temperature thereof.

The stock screw 30 (Figs. 2 and 3) is rotated by a shaft 33, which is keyed to a short shank portion 34 formed integrally with the left hand end of the stock screw, as viewed in Fig. 2. The stock screw 30 forces the plastic compound through the bore 25, a strainer 36 positioned transversely across the discharge end of the bore and into an extrusion head indicated generally at 40. The extrusion head 40 is secured detachably to the discharge end of the extrusion cylinder 20, and includes a body member 42 and a tool holder 44 having a tapered opening 45 which forms a continuation of the extrusion bore 25. The tapered opening 45 communicates with an extrusion passage 50 formed in the tool holder 44 transversely with respect to the tapered opening. An annular die holder 51 positioned in the exit end of the passage 50 has a counterbore 52 formed therein in which is mounted a forming die 53.

The core 15 is advanced continuously from right to left, as viewed in Fig. 1, from top to bottom, as viewed in Fig. 3, from a supply reel 54 by means of a conventional capstan 55. The core 15 passes through a core tube holder 57 and a core tube 60, which guides the core through the axial center of the forming die 53 wherein the core is enveloped by a substantially concentric covering of the plastic compound to form an insulated wire 61. An aligning plate 63 maintains the die holder 51 and the core tube holder 57, and thereby the die 53 and the core tube 60 respectively, centered relative to each other in the extrusion passage 50, and a retaining nut 65 holds the tool holder 44 in the extrusion head 40. The finished insulated wire 61 is taken up on a conventional takeup reel 68.

The stock screw 30 comprises a root 70 about which a single helical flight 72 is formed. The helical flight 72 has a constant external diameter along the entire length of the stock screw 30, which is substantially equal to the internal diameter of the extrusion bore 25. The helix angle of the flight 72, measured as the angle between the flight and a plane perpendicular to the longitudinal axis of the stock screw 30, is constant along the entire length of the screw.

The helical flight 72 is generally rectangular in cross section and relatively small in width in comparison to its pitch. In effect, it forms two sides of a helical channel 75, which is bounded on the bottom by the root 70 and on the top by the wall of the bore 25. The depth of the channel 75 is not constant along the length of the stock screw 30 due to predetermined variations in the diameter of the root 70.

In order to facilitate a description of the above-mentioned variations in the diameter of the root 70, the stock screw 30, excluding the shank portion 34 thereof, may be considered to have been divided lengthwise into three sections, as indicated in Figs. 2 and 3. The stock screw 30 is provided with a receiving end portion A–B lying at the left hand end thereof adjacent to the feed hopper 12, and extending between points on the longitudinal axis of the stock screw designated A and B, respectively. At the right hand end of the stock screw 30, as viewed in Figs. 2 and 3, is a delivery end portion C–D, which as its designation implies extends between points on the longitudinal axis of the stock screw designated C and D, respectively. Between the receiving end portion A–B and the delivery end portion C–D lies an intermediate portion B–C extending longitudinally from point B to point C.

The receiving end portion A–B of the screw 30 is designed to pick up the granules of the plastic compound supplied from the feed hopper 12 through the changing opening 23 to compact the granules into a plastic mass 79 and to carry the plastic mass forward to the intermediate portion B–C of the screw. As diagrammatically represented in Fig. 4, the root 70 along the receiving end portion A–B of the screw 30 is frustoconical in shape and tapers rearwardly uniformly from point B to point A at a relatively small angle with respect to the longitudinal axis of the screw. Along the entire length of the receiving end portion A–B, the root diameter remains relatively small in comparison to the root diameter along the delivery end portion C–D. As a result, the depth of the helical channel 75 along the receiving end portion A–B is relatively large. The root 70 along the delivery end portion C–D is cylindrical in shape and has a relatively large diameter. Consequently, the helical channel 75 along the entire delivery end portion C–D is relatively shallow.

As illustrated in Fig. 4, the depth of the channel 75 along the intermediate portion B–C of the screw 30, is a hyperbolic function of the length along the longitudinal axis of the screw and decreases hyperbolically from point B to point C. The hyperbolic variation in the depth of the channel 75 along the length of the intermediate portion B–C of the screw 30 is by design such as to impart a substantially constant acceleration to the plastic mass 79 as it is propelled along this portion of the channel.

A formula expressing the relationship between the depth of the channel 75 and the distance along the axis of the screw 30, which is necessary to achieve a constant acceleration along the intermediate portion B–C may be derived in the following manner:

Since the helix angle of the flight 72 along the entire length of the screw 30 is constant, the velocity of the plastic mass at any point "X," a distance measured along the longitudinal axis of the screw with point B as an origin, may be expressed as follows:

$$v_x = \frac{K}{h_x}$$

where:

$v_x$=velocity of the plastic mass 79 at a point "X"
$K$=a constant equal to the delivery rate in cubic inches per minute divided by the width of the channel 75, and
$h_x$=the depth of the channel 75 at the point "X."

In order that the velocity of the plastic mass 79 can increase at a uniform rate from point B to point C along the axis of the screw 30, (a constant rate of acceleration) the following relationship must hold.

$$v_x = V_B + CX$$

where:

$V_B$=velocity of the plastic mass at point B
$C$=a constant of proportionality

From the above relationships it follows that:

$$\frac{K}{h_x} = V_B + CX$$

then:

$$h_x = \frac{K}{V_B + CX}$$

The constant of proportionality (C) in the above relationship may be expressed as follows:

$$C = K \left( \frac{\frac{1}{h_C} - \frac{1}{h_B}}{l_{BC}} \right)$$

where:

$K$=a constant equal to the delivery rate in cubic inches per minute divided by the width of the channel 75
$h_B$=the depth of the channel 75 at point B
$h_C$=the depth of the channel 75 at point C
$l_{BC}$=the length of the intermediate portion B–C, (i. e. the distance between points B and C measured along the longitudinal axis of the screw 30)

Thus, the formula expressing the desired relationship between the depth of the channel 75 with respect to the distance along the longitudinal axis of the screw 30 may be stated as follows:

$$h_x = \frac{1}{\left[ \frac{\frac{1}{h_C} - \frac{1}{h_B}}{l_{BC}} \right] X + \frac{1}{h_B}}$$

The receiving end portion A–B of the screw 30 is designed to function essentially as a screw conveyor which picks up solid granules of the plastic material from the charging opening 23, consolidates the granules into a compact plastic mass 79 and delivers the compacted plastic mass to the intermediate portion B–C of the screw. The design of the receiving end portion A–B is such that as the plastic mass 79 approaches the intermediate portion B–C of the screw 30, it is completely compacted and is beginning to melt. The stock screw 30, illustrated in Fig. 2, has a receiving end portion A–B extending approximately two pitch lengths beyond the charging opening 23 which opening has a width, measured along the axis of the screw 30, slightly greater than one pitch length.

The average depth of the helical channel 75 along the receiving end portion A–B of the screw 30 preferably must be sufficient to provide a capacity at least equal to the desired capacity of the entire extruder. Thus, for a plastics extruder of a given capacity provided with a stock screw having a constant pitch, a predetermined minimum average channel depth along the receiving end portion A–B of the screw is required. In this manner the channel $h_B$ is established for a given extruder design.

The delivery end portion C–D of the screw 30 is designed to take the plastic mass 79, which has become entirely molten as it advanced along the intermediate portion B–C, from the intermediate portion and build up sufficient pressure to force the molten plastic through the strainer 36 into the extruding head 40 and out of the forming die 53 at a desired flow rate. The channel 75 along the entire length of the delivery end portion C–D of the screw 30 is relatively shallow having a constant depth ($h_C$) which is very small in comparison to the pitch of the screw. Since the channel 75 is relatively wide and shallow along the delivery end portion C–D of the screw 30, the flow of the plastic mass 79 is relatively smooth and considerable pressure is built up to enable the plastic mass to flow at a very steady rate through the strainer 36 and the forming die 53, both of which offer relatively high resistance to the flow.

The length of the delivery end portion C–D of the screw 30 and the constant depth ($h_C$) of the channel 75 along this portion are established by the requirements of the extruder 10, that is, by the particular plastic compound which is to be processed, the amount of working required, the delivery rate desired at a given screw speed and the required build up of pressure necessary to overcome the resistance to flow offered by the strainer 36 and the forming die 53.

As an example, an extruder embodying the invention and designed specifically for extruding polyethylene was provided with an extrusion cylinder having a cylindrical extrusion bore 25 with a two inch diameter. The dimensions of the stock screw employed were as follows:

Length of the receiving end portion A-B ($l_{AB}$) = 8.0 inches

Length of the intermediate portion B-C ($l_{BC}$) = 16.0 inches

Length of the delivery end portion C-D ($l_{CD}$) = 7.06 inches

Depth of the helical channel 75 at point A ($h_A$) = 0.314 inch

Depth of the helical channel 75 at point B ($h_B$) = 0.224 inch

Depth of the helical channel 75 at point C ($h_C$) = 0.020 inch

Constant helix angle of the single flight 72 = 17°42′

Width of the flight 72 = 0.250 inch

Pitch length = 2.0 inches

OPERATION

In the operation of the extruder 10 described hereinabove, the stock screw 30 is rotated continuously in the extrusion bore 25 by the shaft 33, which is operatively connected to a suitable driving means, such as an electric motor, indicated generally at 80. The plastic compound, for example, polyethylene, which is to be extruded is introduced in the form of solid granules from the feed hopper 12 into the bore 25 through the charging opening 23. The helical flight 72 on the rotating screw 30 picks up the polyethylene granules from the charging opening 23 and forces them constantly toward the delivery end of the screw.

As the polyethylene granules progress toward the right, as viewed in Figs. 2 and 3, the helical channel 75 becomes slightly shallower at a uniform rate along the receiving end portion A-B and the polyethylene granules are compacted into a solid plastic mass 79 of polyethylene. The velocity of the plastic mass 79 increases slightly as it approaches the intermediate portion B-C of the screw 30. A graph of velocity versus length along the screw 30 shown in Fig. 5 discloses the slight increase in the velocity of the plastic mass along the receiving end portion A-B of the screw. Further, the temperature of the plastic mass 79 increases sufficiently, due to the shearing and working action which takes place as it is rubbed between the wall of the bore 25 and the root 70 of the screw 30, to cause the polyethylene to begin to melt.

As the plastic mass 79 is advanced along the intermediate portion B-C, the velocity of the plastic mass increases rapidly at a constant rate of acceleration, due to the fact that the depth of the channel 75 along the intermediate portion decreases hyperbolically in accordance with the above-described relationship:

$$h_x = \frac{1}{\left[\frac{\frac{1}{h_C} - \frac{1}{h_B}}{l_{BC}}\right] X + \frac{1}{h_B}}$$

This uniform and rapid increase in the velocity of the plastic mass along the intermediate portion B-C is illustrated graphically in Fig. 5.

As the depth ($h_x$) of the channel 75 decreases hyperbolically along the intermediate portion B-C of the screw 30 in accordance with the above-mentioned relationship, the shearing and working action thereon increases greatly and the plastic mass 79 becomes progressively more plastic. Before the plastic mass 79 reaches the delivery end portion C-D of the screw 30 it is completely molten.

Since the channel 75 along the delivery end portion C-D is very shallow, the shearing and working action is intense and there is a rapid build up of pressure and temperature within the plastic mass 79. The temperature of the plastic mass 79 may be controlled, if necessary, by the circulation of a suitable heat exchange medium within the passage 21 in the cylinder 20 and the conduit 31 in the screw 30.

The velocity of the plastic mass 79 as it is advanced along the delivery end portion C-D of the screw 30 remains constant because of the uniform depth ($h_C$) of the channel 75 therealong. When the plastic mass 79 finally reaches the discharge end of the screw 30, the necessary pressure has been built up to force the plastic mass through the strainer 36 and out of the forming die 53 at the desired output rate. The plastic mass 79 of polyethylene entering the tapered opening 45 in the extrusion head 40 is now in a thoroughly plasticized and worked condition, thereby assuring an extruded covering 14 of superior quality on the continuously advancing filamentary core 15.

Illustrated for comparison in Fig. 6 are the screw characteristics (flow rate versus pressure) for two substantially identical extruders, except that one is provided with an improved stock screw constructed in accordance with the invention, and the other is provided with a stock screw of a conventional design having a uniformly tapered root along the intermediate portion B-C thereof. The dimensions of the two screws are otherwise substantially identical. It will be noted that the screw characteristics of the improved screw reveal a significantly greater output than the conventional screw at higher pressures. Since in the manufacture of extruded plastic insulated wire it is necessary to force the plastic compound at a very steady rate through a die which has a relatively high resistance to flow, the improved screw is markedly superior to the conventional screw. Further, as the strainer positioned in the path of the plastic flow becomes clogged, as is usual during prolonged operation of an extruder, and the back pressure increases due to increased resistance to flow, the output of the improved screw 30 will remain much more constant than the conventional screw.

Modified embodiment

Referring now to Fig. 7, there is shown a stock screw 130 forming part of another embodiment of the invention. The stock screw 130 is provided with a helical channel 175 and is identical in every respect to the stock screw 30, except for the intermediate portion B-C thereof.

Whereas the depth channel 75 along the intermediate portion B-C of the stock screw 30 varies hyperbolically, the change in the depth channel 175 along the intermediate portion B-C of the stock screw 130 consists of a series of three uniform variations which approximate closely the optimum hyperbolic function. This has been achieved by dividing the root 170 of the screw 175 along the intermediate portion B-C into three frustoconical intermediate sections B-B′, B′-B″ and B″-C. As illustrated in Fig. 7, the shape of these frustoconical intermediate sections is by design such that the depth of the channel 175 along the intermediate portion B-C of the screw 130 closely approximates the aforementioned hyperbolic relationship.

Manifestly, the stock screw 130 of the modified embodiment represents only a practical compromise from the optimum design, but it retains substantially all of the advantageous characteristics of the optimum design. However, because of the simplified contour of the root 170 of the stock screw 130, as compared with the more complicated contour of the root 70 of the stock screw 30, the former, although only a compromise, is much easier to machine.

It will be understood that the hyperbolic variation in the depth of the channel 75 along the intermediate portion B-C of the screw 30 representing the optimum design, might be approximated by any number of suitably shaped intermediate sections greater than one. Of course, the greater the number of sections utilized, the closer the approximation that may be obtained.

The terms "plastic material" and "plastic compound," as employed in the specification and appended claims, will be understood to include thermoplastic compounds, such as polyvinyl halide compounds, plasticized polystyrene, nylon, polyethylene, or the like, and thermosetting compounds, such as rubber, Buna S and neoprene compounds and compounds of other rubbery elastomers, or the like. Polyethylene has been mentioned specifically in the description of the operation merely as an example of a plastic compound.

It will be understood further that various embodiments and modifications thereof may be made without departing from the spirit and scope of the invention.

What is claimed is:

1. Apparatus for simultaneously advancing and working a plastic compound, which comprises an extrusion cylinder having a longitudinally extending cylindrical bore formed therein, and an extrusion screw fitting closely within the bore and having a helical channel extending substantially from one end to the other end thereof, the channel along the initial portion of the bore being relatively deep and the depth of the channel along a subsequent portion of the bore decreasing substantially hyperbolically according to the equation:

$$h_x = \frac{1}{\left[\dfrac{\dfrac{1}{h_C} - \dfrac{1}{h_B}}{l_{BC}}\right] X + \dfrac{1}{h_B}}$$

where:

$X$ = the distance along the screw axis from the beginning of the hyperbolically-tapered portion,
$h_x$ = the depth of the channel at any point ($X$) along the hyperbolically-tapered portion,
$h_B$ = the depth of the channel at the beginning of the hyperbolically-tapered portion,
$h_C$ = the depth of the channel at the end of the hyperbolically-tapered portion, and
$l_{BC}$ = the length of the hyperbolically-tapered portion.

2. Apparatus for simultaneously advancing and plasticizing plastic compounds, which comprises an extrusion cylinder having a longitudinally extending cylindrical bore formed therein, and an extrusion screw fitting closely within the bore and having a helical channel of uniform width extending substantially from one end to the other end thereof, said screw having a receiving end portion of a predetermined length at one end thereof and a delivery end portion of a predetermined length at the other end thereof and said channel being relatively deep along the receiving end portion and relatively shallow along the delivery end portion with the depth of the channel along an intermediate portion of the screw decreasing substantially hyperbolically according to the equation:

$$h_x = \frac{1}{\left[\dfrac{\dfrac{1}{h_C} - \dfrac{1}{h_B}}{l_{BC}}\right] X + \dfrac{1}{h_B}}$$

where:

$X$ = the distance along the screw axis from the beginning of the hyperbolically-tapered portion,
$h_x$ = the depth of the channel at any point ($X$) along the hyperbolically-tapered portion,
$h_B$ = the depth of the channel at the beginning of the hyperbolically-tapered portion,
$h_C$ = the depth of the channel at the end of the hyperbolically-tapered portion, and
$l_{BC}$ = the length of the hyperbolically-tapered portion.

3. Apparatus for simultaneously advancing and plasticizing plastic compounds, which comprises an extrusion cylinder having a longitudinally extending cylindrical bore formed therein, and an extrusion screw fitting closely within the bore and having a helical channel of uniform width extending substantially from one end to the other end thereof, said screw having a receiving end portion of a predetermined length at one end thereof and a delivery end portion of a predetermined length at the other end thereof and said channel being relatively deep along the receiving end portion and relatively shallow and having a constant depth along the delivery end portion with the depth of the channel along the intermediate portion of the screw decreasing substantially hyperbolically according to the equation:

$$h_x = \frac{1}{\left[\dfrac{\dfrac{1}{h_C} - \dfrac{1}{h_B}}{l_{BC}}\right] X + \dfrac{1}{h_B}}$$

where:

$X$ = the distance along the screw axis from the beginning of the hyperbolically-tapered portion,
$h_x$ = the depth of the channel at any point ($X$) along the hyperbolically-tapered portion,
$h_B$ = the depth of the channel at the beginning of the hyperbolically-tapered portion,
$h_C$ = the depth of the channel at the end of the hyperbolically-tapered portion, and
$l_{BC}$ = the length of the hyperbolically-tapered portion.

4. Apparatus for simultaneously advancing and plasticizing plastic compounds, which comprises an extrusion cylinder having a longitudinally extending cylindrical bore formed therein, and an extrusion screw fitting closely within the bore and having a helical channel of uniform width extending substantially from one end to the other end thereof, said screw having a receiving end portion of a predetermined length at one end thereof and a delivery end portion of a predetermined length at the other end thereof and said channel being relatively deep along the receiving end portion and relatively shallow along the delivery end portion with the depth of the channel along the intermediate portion of the screw decreasing substantially hyperbolically according to the equation:

$$h_x = \frac{1}{\left[\dfrac{\dfrac{1}{h_C} - \dfrac{1}{h_B}}{l_{BC}}\right] X + \dfrac{1}{h_B}}$$

where:

$X$ = the distance along the screw axis from the beginning of the hyperbolically-tapered portion,
$h_x$ = the depth of the channel at any point ($X$) along the hyperbolically-tapered portion,
$h_B$ = the depth of the channel at the beginning of the hyperbolically-tapered portion,
$h_C$ = the depth of the channel at the end of the hyperbolically-tapered portion, and
$l_{BC}$ = the length of the hyperbolically-tapered portion, said intermediate portion of the screw having a length approximately one-half of the total length of the screw.

5. Apparatus for simultaneously advancing and plasticizing plastic compounds, which comprises an extrusion cylinder having a longitudinally extending cylindrical bore formed therein, and an extrusion screw fitting closely within the bore and having a helical channel extending substantially from one end to the other end thereof, one end being a receiving end and the other end being a delivery end, said extrusion screw having a root of such a contour that the channel is relatively deep along the receiving end portion thereof and relatively shallow along the delivery end portion of the screw, the intermediate portion of the root consisting of a plurality of frusto-conical sections so designed that the depth of the channel along said intermediate portion decreases approximately hyperbolically according to the equation:

$$h_x = \frac{1}{\left[\dfrac{\dfrac{1}{h_C} - \dfrac{1}{h_B}}{l_{BC}}\right] X + \dfrac{1}{h_B}}$$

where:

$X$ = the distance along the screw axis from the beginning of the hyperbolically-tapered portion, $h_x$ = the depth of the channel at any point (X) along the hyperbolically-tapered portion, $h_B$ = the depth of the channel at the beginning of the hyperbolically-tapered portion, $h_C$ = the depth of the channel at the end of the hyperbolically-tapered portion, and $l_{BC}$ = the length of the hyperbolically-tapered portion.

References Cited in the file of this patent

UNITED STATES PATENTS

| | | |
|---|---|---|
| 2,622,469 | Gray | Dec. 23, 1952 |
| 2,704,380 | Cuzzi | Mar. 22, 1955 |